(12) United States Patent
Ahmed et al.

(10) Patent No.: US 11,264,856 B2
(45) Date of Patent: Mar. 1, 2022

(54) HAIRPIN WINDING ELECTRIC MACHINE

(71) Applicant: Ford Global Technologies, LLC, Dearborn, MI (US)

(72) Inventors: Adeeb Ahmed, Canton, MI (US); Kyi Shin Shiah, Northville, MI (US); Jacob Krizan, Farmington Hills, MI (US); Huifen Qiu, Canton, MI (US); Joel Hetrick, Ann Arbor, MI (US); Chun Tang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 321 days.

(21) Appl. No.: 16/438,981

(22) Filed: Jun. 12, 2019

(65) Prior Publication Data

US 2020/0395804 A1    Dec. 17, 2020

(51) Int. Cl.
*H02K 3/28*  (2006.01)
*H02K 3/14*  (2006.01)
*H02K 1/16*  (2006.01)

(52) U.S. Cl.
CPC ............... *H02K 3/28* (2013.01); *H02K 1/16* (2013.01); *H02K 3/14* (2013.01)

(58) Field of Classification Search
CPC ........ H02K 1/16; H02K 2213/03; H02K 3/14; H02K 3/28
See application file for complete search history.

(56) References Cited

U.S. PATENT DOCUMENTS

| 7,989,996 | B2* | 8/2011 | Wolf | H02K 3/28 |
| | | | | 310/68 D |
| 9,685,846 | B2 | 6/2017 | Guercioni | |
| 2013/0221793 | A1* | 8/2013 | Minoshima | H02K 3/28 |
| | | | | 310/207 |
| 2015/0102699 | A1* | 4/2015 | Mathoy | H02K 3/14 |
| | | | | 310/213 |
| 2018/0034335 | A1 | 2/2018 | Neet et al. | |
| 2019/0020237 | A1 | 1/2019 | Neet | |
| 2021/0126501 | A1* | 4/2021 | Neet | H02K 3/12 |

* cited by examiner

*Primary Examiner* — Thienvu V Tran
*Assistant Examiner* — Bart Iliya
(74) *Attorney, Agent, or Firm* — David B Kelley; Brooks Kushman P.C.

(57) ABSTRACT

An electric machine includes a stator core defining circumferentially arranged slots alternating between odd and even slots. Each slot has radial pin positions arranged in adjacent pairs to define radial layers. A hairpin winding includes a first path of interconnected hairpins that is disposed in the stator core such that, for each of the radial layers, the first path is disposed in the odd slots and the even slots a same number of times.

17 Claims, 8 Drawing Sheets

HAIRPIN WINDING ELECTRIC MACHINE

TECHNICAL FIELD

The present disclosure relates to electric machines and more specifically to electric machines that include hairpin windings.

BACKGROUND

Vehicles such as battery-electric vehicles and hybrid-electric vehicles contain a traction-battery assembly to act as an energy source for the vehicle. The traction battery may include components and systems to assist in managing vehicle performance and operations. The traction battery may also include high-voltage components, and an air or liquid thermal-management system to control the temperature of the battery. The traction battery is electrically connected to an electric machine that provides torque to driven wheels. Electric machines typically include a stator and a rotor that cooperate to convert electrical energy into mechanical motion or vice versa.

SUMMARY

According to one embodiment, an electric machine includes a stator core defining circumferentially arranged slots alternating between odd and even slots. Each slot has radial pin positions arranged in adjacent pairs to define radial layers. A hairpin winding includes a first path of interconnected hairpins that is disposed in the stator core such that, for each of the radial layers, the first path is disposed in the odd slots and the even slots a same number of times.

According to another embodiment, an electric machine includes a stator core defining circumferentially arranged slots. Each slot has radial pin positions arranged in adjacent pairs to define radial layers. A first phase of a hairpin winding includes a plurality of first hairpins interconnected to each other without a jumper to form a first winding path. The first hairpins have first short-pitch pins and first long-pitch pins. The first path is disposed in corresponding ones of the slots such that one of the first short-pitch pins and one of the first long-pitch pins are disposed in each of the radial layers. The first phase of a hairpin winding further includes a plurality of second hairpins interconnected to each other without a jumper to form a second winding path. The second hairpins have second short-pitch pins and second long-pitch pins. The second path is disposed in corresponding ones of the slots such that one of the second short-pitch pins and one of the second long-pitch pins are disposed in each of the radial layers.

According to yet another embodiment, an electric machine includes a stator core defining circumferentially arranged slots that each have radial pin positions arranged in adjacent pairs to define radial layers. A first phase of a hairpin winding includes a plurality of first hairpins interconnected to each other without a jumper to form a first winding path. The first hairpins have first short-pitch pins and first long-pitch pins. The first path is disposed in corresponding ones of the slots such that one of the first short-pitch pins and one of the first long-pitch pins are disposed in each of the radial layers. The first phase of a hairpin winding further includes a plurality of second hairpins interconnected to each other without a jumper to form a second winding path. The second hairpins have second short-pitch pins and second long-pitch pins. The second path is disposed in corresponding ones of the slots such that one of the second short-pitch pins and one of the second long-pitch pins are disposed in each of the radial layers. The first phase of a hairpin also winding includes a plurality of third hairpins interconnected to each other without a jumper to form a third winding path. The third hairpins have third short-pitch pins and third long-pitch pins. The third path is disposed in corresponding ones of the slots such that one of the third short-pitch pins and one of the third long-pitch pins are disposed in each of the radial layers. The first phase of a hairpin winding additionally includes a plurality of fourth hairpins interconnected to each other without a jumper to form a fourth winding path. The fourth hairpins have fourth short-pitch pins and fourth long-pitch pins. The fourth path is disposed in corresponding ones of the slots such that one of the fourth short-pitch pins and one of the fourth long-pitch pins is disposed in each of the radial layers. A first neutral bridge is connected to the first and second paths, and a second neutral bridge connected to the third and fourth paths.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
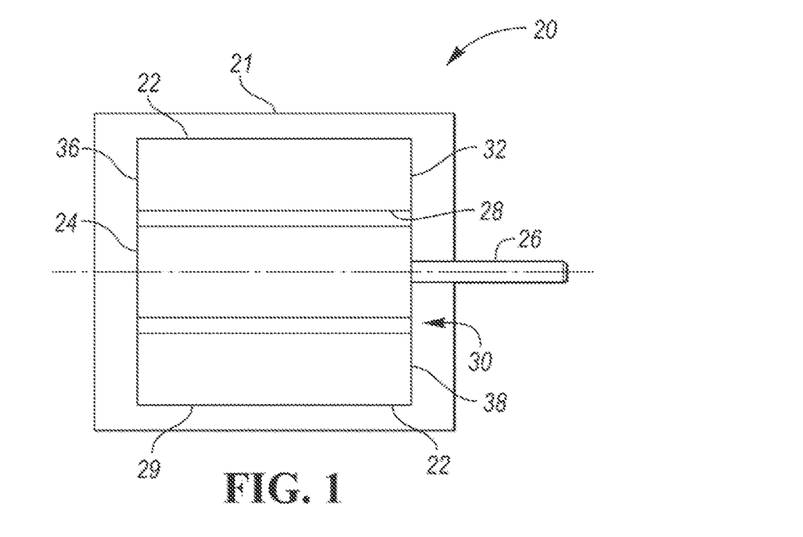
FIG. 1 is a schematic diagram of an electric machine.

Referring to FIG. 1, an electric machine 20 may be used in a vehicle such as a fully electric vehicle or a hybrid-electric vehicle. The electric machine 20 may be referred to as an electric motor, a traction motor, a generator, or the like. The electric machine 20 may be a permanent magnet machine, an induction machine, or the like. In the illustrated embodiment, the electric machine 20 is a three-phase alternating current (AC) machine. The electric machine 20 is capable of acting as both a motor to propel the vehicle and as a generator such as during regenerative braking.

The electric machine 20 may be powered by a traction battery of the vehicle. The traction battery may provide a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine 20. For example, a typical traction battery may provide a DC voltage while the electric machine 20 may require a three-phase (AC) voltage. The power electronics module may include an inverter that converts the DC voltage to a three-phase AC voltage as required by the electric machine 20. In a regenerative mode, the power electronics module may convert the three-phase AC voltage from the electric machine 20 acting as a generator to the DC voltage required by the traction battery.

Figure 2:
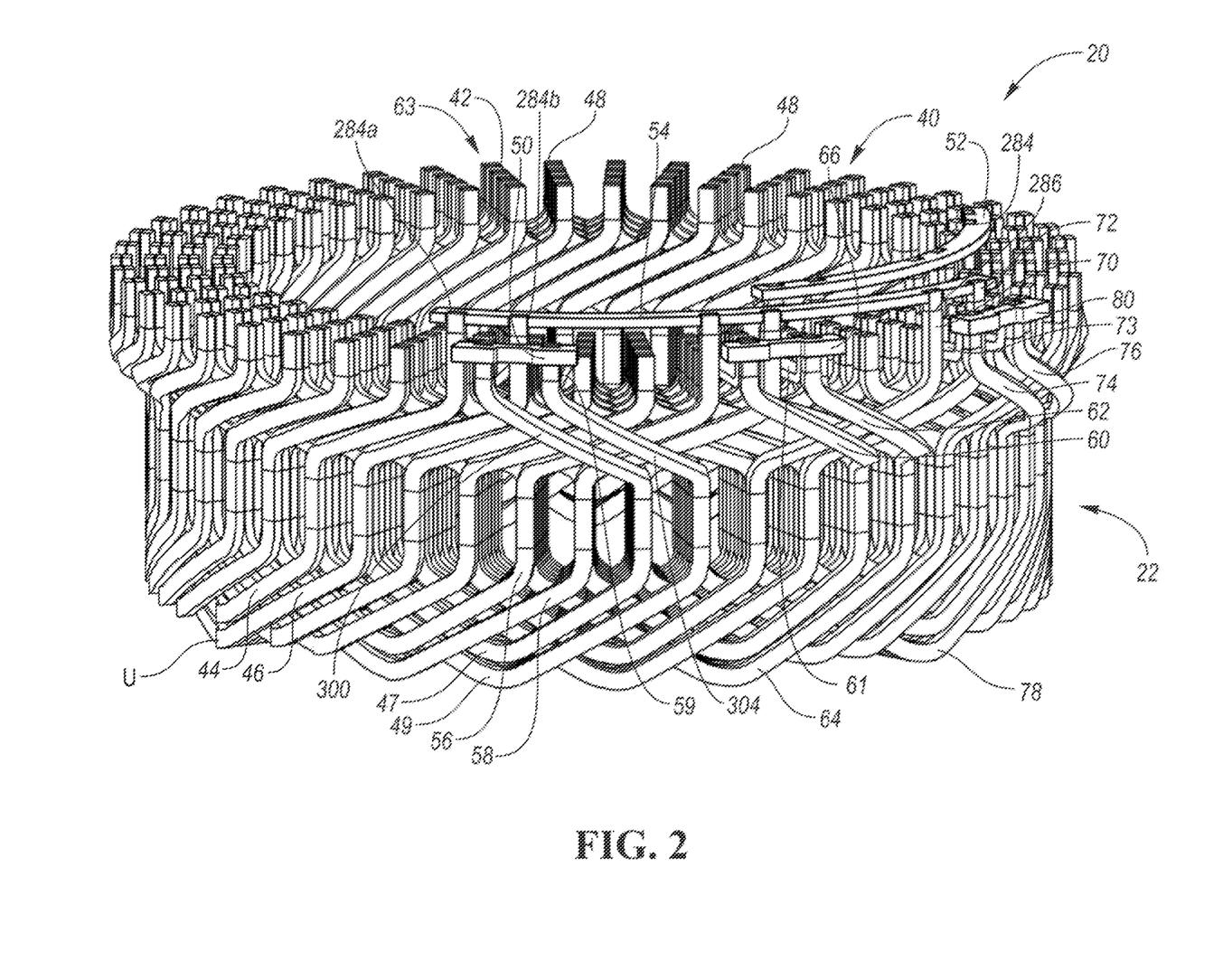
FIG. 2 is a diagrammatical perspective view of a winding of the electric machine with legs of the hairpins substantially shortened for illustrative purposes.

Referring to FIGS. 1 and 2, the electric machine 20 includes a housing 21 that encloses the stator 22 and the rotor 24. The stator 22 is fixed to the housing 21 and includes a cylindrical core 32 having an inner diameter 28 that defines a hole 30 and an outer diameter 29. The core 32 may be formed from a plurality of stacked laminations. The rotor 24 is supported for rotation within the hole 30. The rotor 24 may include windings or permanent magnets that interact with windings of the stator 22 to generate rotation of the rotor 24 when the electric machine 20 is energized. The rotor 24 may be supported on a driveshaft 26 that extends through the housing 21. The driveshaft 26 is configured to couple with a drivetrain of the vehicle.

The stator core 32 defines slots 34 (see FIG. 4) circumferentially arranged around the core 32 and extending outward from the inner diameter 28. The slots 34 may be equally spaced around the circumference and extend axially from a first end 36 of the core 32 to a second end 38. In the illustrated embodiment, the core 32 defines forty-eight slots and has eight poles. Each pole covers 180 electrical degrees, which corresponds to six slots in the illustrated embodiment. For convention herein, Pole 1 starts at slot 1 and includes slots 1 through 6, Pole 2 starts at Slot 7 and includes slots 7 through 12, etc. The poles may be discussed in pairs. Pole pair 1 includes poles 1 and 2; pole pair 2 includes poles 3 and 4; pole pair 3 includes poles 5 and 6; and pole pair 4 includes poles 7 and 8. In the illustrated embodiment each pole pair includes 12 slots. The core 32 may include more or fewer slots and/or poles in other embodiments. For example, the core 32 may define seventy-two slots and have eight poles.

The slots 34 are spaced by a circumferential distance measured between the center lines of two adjacent slots. This distance can be used as a unit of distance (hereinafter "a slot") for relating and measuring other components of the stator 22. The distance unit "slot" is sometimes referred to as "slot pitch" or "slot span."

The electric machine 20 may include hairpin windings 40 placed in the slots 34 of the core 32. Hairpin windings are an emerging technology that improves efficiency for electric machines used in vehicles. The hairpin windings 40 improve efficiency by providing a greater amount of stator conductors to reduce resistance of the winding 40 without encroaching into space reserved for the electrical steel and the magnetic flux path. The hairpin windings 40 may be wave windings in which the windings 40 weave pole to pole in a wave-like pattern.

One challenge with hairpin winding is matching the electric machine design to the desired torque-speed curve. An essential step in designing an electric machine is selecting the phase turn number so that the torque-speed curve covers all required operating points. For conventional stranded windings made of long wires connected in parallel, the desired phase turn number is selected by choosing the number of turns per coil, the number of parallel paths, the number of poles, the number of slots per pole, and the number of layers. While all these factors are also available for hairpin windings, the limiting factors are very different resulting in fewer feasible choices.

For example, while the possible number of poles, slots per pole, and layers are identical between the two technologies, it is not practical in a hairpin winding to have as many turns per coil as in a stranded winding. Each hairpin needs to be connected to the next hairpin by welding, soldering or the like, and needs to be bent according to a specific shape in order to make the connection possible. This limits the number and size of the conductors that can be fit in a single slot. Another challenge is creating parallel circuits that are balanced (i.e., not causing large circulating currents in the loop formed by the parallel circuits due do dissymmetry) and have reasonably complex connections.

The electric machine 20 solves these and other problems. The electric machine 20 may be a three-phase machine in which the hairpin windings 40 are arranged in a U phase, a V phase, and a W phase. Each phase includes associated hairpins conductors (also known as pins, hairpins, or bar conductors) arranged in four parallel paths of windings in the illustrated embodiment. Each phase may include more or less parallel paths in other embodiments.

The hairpins are generally U-shaped and include a pair of legs joined by a crown. The hairpins are installed in the stator core 32 by inserting the legs through corresponding ones of the slots 34. All of the hairpins may be installed from the same end of the stator core 32, e.g., end 36, so that all of the crowns are located on one end of the stator, e.g., end 36, and the ends of the legs are located on the other end, e.g., end 38. Once installed, the legs of the hairpins are bent away from each other to from twists that connect with the twists of other hairpins. The ends of corresponding hairpins are joined by a connection such as a weld 48. The connections may be arranged in rows such as weld rows 63. End 36 may be referred to as the crown end and end 38 may be referred to as the weld end.

The U phase may include a first path 44, a second path 46, a third path 47, and a fourth path 49. The paths are formed by a plurality of interconnected pins 42. Each of the paths includes a first end that starts at the U-phase terminal 50 and a second end that ends to a neutral connection. In the illustrated embodiment, the electric machine 20 includes an inboard neutral connection 52 and an outboard neutral connection 54. The first and second paths 44, 46 connect to the outboard neutral connection 54, and the third and fourth paths 47, 49 connect to the inboard neutral connection 52. The paths 44, 46, 47, 49 are connected to each other at the terminal 50, which is located near the outer diameter (OD) 29 of the stator core. The paths may be arranged in pairs with the first and second paths 44, 46 being a pair and the third and fourth paths 47, 49 being a pair. The paths may be referred to as pair because these paths wind through the stator core 32 in the same direction and adjacent to each other.

The first and second paths 44, 46 start near the inner diameter (ID) 28 of the stator core and have extended terminal leads 59 to connect to the terminal 50. The terminal leads 59 extend radially through adjacent weld rows 63 to thread through the windings 40 to connect with the terminal 50. The first and second paths 44, 46 wind in the counter-clockwise direction (when looking at end 38) through the slots 34 and end near the OD 29 at the outboard neutral connection 54. The first and second paths 44, 46 may wind around the stator core approximately four times. The third and fourth paths 47, 49 start near the OD 29 of the stator core and wind in the clockwise direction through the slots 34. The third and fourth paths 47, 49 may wind around the stator core approximately four times and end near the ID 28 at the inboard neutral connection 52. In the illustrated embodiment, each of the paths includes sixteen pins that are interconnected end-to-end to form a continuous conductor between the terminal 50 and the neutral connection 52 or 54.

The V phase may include a first path 56, a second path 58, a third path 60, and a fourth path 62. The paths are formed by a plurality of interconnected pins 64. Each of the paths includes a first end that starts at the V-phase terminal 66 and a second end that ends at neutral connection 52 or 54. The first and second paths 56, 58 connect to the outboard neutral connection 54 and the third and fourth paths 60, 62 connect to the inboard neutral connection 52. The paths 56, 58, 60, 62 are connected to each other at the terminal 66, which is located near the OD 29 of the stator core.

The first and second paths 56, 58 start near the ID 28 of the stator core and have extended terminal leads 61 to connect to the terminal 50. The terminal leads extend radially through adjacent weld rows 63 to thread through the windings 40 to connect with the terminal 66. The first and second paths 56, 58 wind in the counterclockwise direction through the slots 34 and end near the OD 29 at the outboard neutral connection 54. The first and second paths 56, 58 may wind around the stator core approximately four times. The third and fourth paths 60, 62 start near the OD 29 of the stator core and wind in the clockwise direction through the slots 34. The third and fourth paths 60, 62 may wind around the stator core approximately four times and end near the ID 28 at the inboard neutral connection 52. In the illustrated embodiment, each of the paths includes sixteen pins that are interconnected end-to-end to form a continuous conductor between the terminal 66 and the neutral connection 52 or 54.

The W phase may include a first path 70, a second path 72, a third path 74, and a fourth path 76. The paths are formed by a plurality of interconnected pins 78. Each of the paths includes a first end that starts at the W-phase terminal 80 and a second end that ends at neutral connection 52 or 54 The first and second paths 70, 72 connect to the outboard neutral connection 54, and the third and fourth paths 74, 76 connect to the inboard neutral connection 52. The paths 70, 72, 74, 76 are connected to each other at the terminal 80, which is located near the OD 29 of the stator core.

The first and second paths 70, 72 start near the ID 28 of the stator core and have extended terminal leads 73 to connect to the terminal 80. The terminal leads 82 extend radially through adjacent weld rows 63 to thread through the windings 40 to connect with the terminal 80. The first and second paths 70, 72 wind in the counterclockwise direction through the slots 34 and end near the OD 29 at the outboard neutral connection 54. The first and second paths 70, 72 may wind around the stator core approximately four times. The third and fourth paths 74, 76 start near the OD 29 of the stator core and wind in the clockwise direction through the slots 34. The third and fourth paths 74, 76 may wind around the stator core approximately four times and end near the ID 28 at the inboard neutral connection 52. In the illustrated embodiment, each of the paths includes sixteen pins that are interconnected end-to-end to form a continuous conductor between the terminal 50 and the neutral connections 52 or 54. The terminals 50, 66, and 80 may include additional leads to connect to the inverter and receive voltage from the inverter, which creates torque-producing current in the winding paths causing the rotor 24 to rotate within the stator 22.

The windings 40 may be jumperless, i.e., each hairpin is interconnected to another hairpin directly. A jumper is a conductor that is typically disposed at one of the ends of the stator core, i.e. does not extend through a slot, and interconnects hairpins that are spaced apart such that they cannot be directly connected to each other. Jumpers add material to the windings and require additional manufacturing. Costs can be reduced, and manufacturing efficiencies can be gained, by designing windings that do not require jumpers, such as winding 40.

The neutral connections 52 or 54 may include a body such as a strip of conductive metal or other material. The body defines openings that connect with hairpins. In the illustrated embodiment, the neutral connection 52, 54 defines six openings 284. The openings may be grouped in pairs of two such as openings 284*a* and 284*b*. Each of the groupings are associated with one of the phases. The U phase is associated with the openings 284*a* and 284*b*. The pins have weld portion 286 received in openings 284. The weld portions 286 may be lengthened to provide clearance for the neutral connection 54 to be attached to the weld portions 286 above other portions of the windings 40.

Figure 3A:
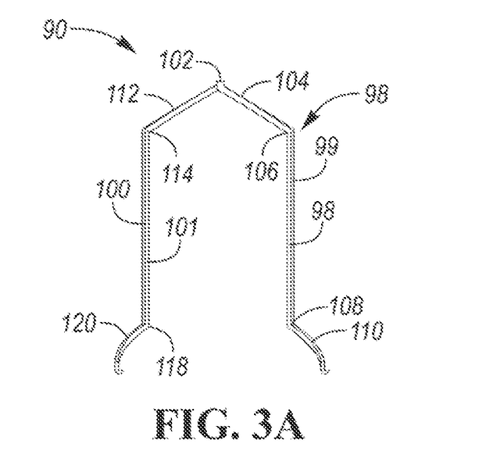
FIG. 3A is a front view of a regular hairpin

Referring to FIG. 3*a*, the hairpins of each of the paths may include one or more types of hairpins such as a regular pin 90. Different types of hairpins may differ in shape or size. The regular pins 90 may include a first leg 98 joined to a second leg 100 at a vertex 102. The vertex 102 may radially offset the legs to place the legs in different slot positions. The vertex 102 may be formed by a twist that radially offset the legs by the dimension of one pin in the radial direction. The pins 90 may be formed from a single piece of metal such as copper, aluminum, silver, or any other electrically conductive material. The first leg 98 is disposed in one of the slots 34 and the second leg 100 is disposed in another of the slots 34 that is spaced apart by a span of slots. The regular pins 90 may have a span (N) equal to the number of slots per pole, which is six slots in the illustrated embodiment. Thus, if the first leg 98 was in Slot 1, the second leg 100 would be in Slot 7. The first leg 98 includes a straight portion 99 disposed within a slot 34 and a first angled portion 104 that extends between the vertex 102 and the straight portion 99. The straight portion 99 and the angled portion 104 are joined at a first bend 106. The first leg 98 also includes a twist 110 that is angled outward at a second bend 108. The second leg 100 includes a straight portion 101 disposed within a slot 34 and a first angled portion 112 that extends between the vertex 102 and the straight portion 101. The first and second angled portions 104, 112 and the vertex by be collectively referred to as a crown. The straight portion 101 and the angled portion 112 are joined at a first bend 114. The second leg 100 also includes a twist 120 that is angled outward at a second bend 118. The twists 110, 120 angle in opposite directions to extend away from the pin 90 to connect with other pins of the path. In other types of pins, the twist may extend in the same direction. The twists 110, 120 may have a span that is equal to the pin span divided by 2, which is three (6/2) in the illustrated embodiment. Thus, the regular pins 90 have a total span of twelve slots. The pins that attached to the terminals and neutral connected may have a slightly longer or shorter twists to facilitate the connection.

The regular pin 90 may be fabricated by first forming the vertex 102, the first angled portions 104, 112, and two extended straight portions. Then, the pin 90 is installed into the stator 22 by inserting the extended straight portions into the slots 34 of the stator 22. The second bends 108, 118 and the twists 110, 120 are formed after the pin 90 is installed through the slots by bending the extended legs as desired. The first and last regular pins of a path may have a longer or shorter twist to connect with the terminal leads or neutral connection.

Figure 3B:
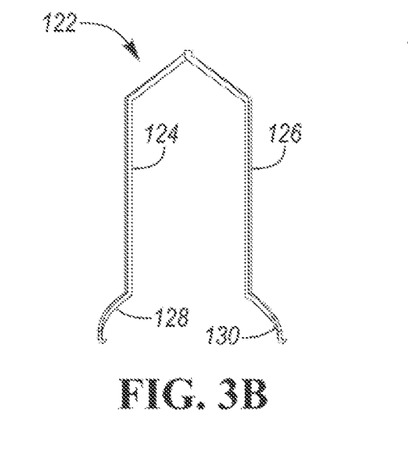
FIG. 3B is a front view of a short-pitch hairpin.

Referring to FIG. 3*b*, another type of hairpin is a short-pitch pin 122. The short-pitch pin 122 has a shorter slot span than the regular pins 90 (e.g., N−1). The short-pitch pin 122 may be shorter by one slot. The construction of the short-pitch pin 122 is similar to the regular pins 90 albeit with the legs 124 and 126 being spaced apart by a fewer number of slots. The twists 128, 130 of the short-pitch pin 122 may be the same length as the twists 110, 120 of the regular pin 90, or, alternatively, the twists 128, 130 may be longer or shorter. In the illustrated embodiment, the legs 124, 126 are spaced apart by five slots giving an overall length of 11.

Figure 3C:
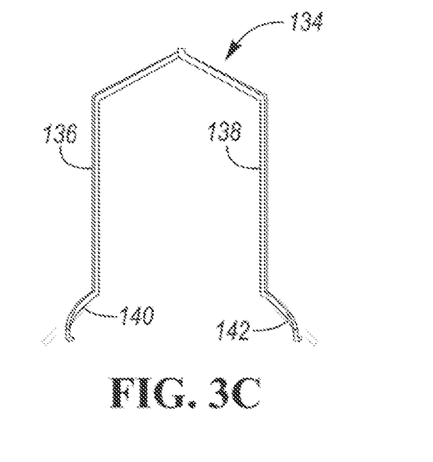
FIG. 3C is a front view of a long-pitch hairpin.

Referring to FIG. 3*c*, yet another type of hairpin is a long-pitch pin 134. The hairpin 134 has a construction similar to that of the regular pin 90 albeit with a longer overall span (e.g., N+1). The hairpin 134 includes a first leg 136 and a second leg 138. The legs 136, 138 have associated twist 140 and 142, respectively. The legs 136 and 138 may be spaced apart by one more slot than the regular pins 90. In the illustrated embodiment, the legs 136, 138 are spaced apart by seven slots. The twists 140, 142 of the long-pitch pin 130 may be the same length as the twists 110, 120 of the regular pin 90, or, alternatively, the twists 142, 144 may be longer or shorter. In the illustrated embodiment, the twist 142, 144 are the same giving the pin 134 an overall length of 13 slots.

Additionally, other windings 40 include additional types of pins that have longer or shorter spans and/or twists. The above dimensions given for the hairpins are exemplary and or not limiting.

Figure 4:
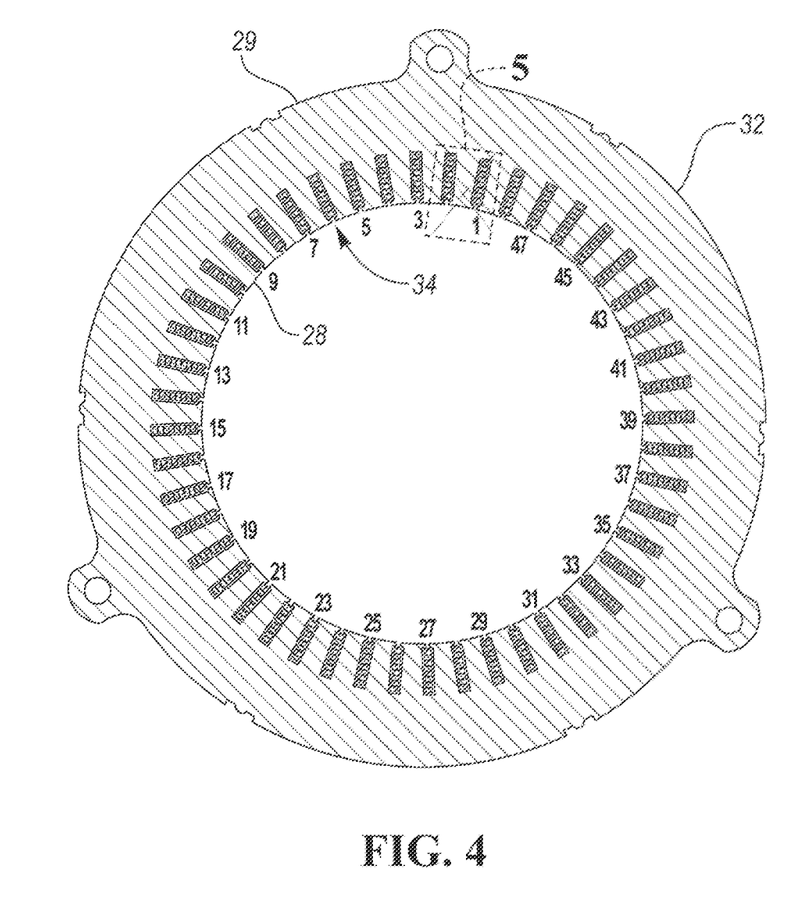
FIG. 4 is a cross-sectional end view of a stator of the electric machine.
Figure 5:
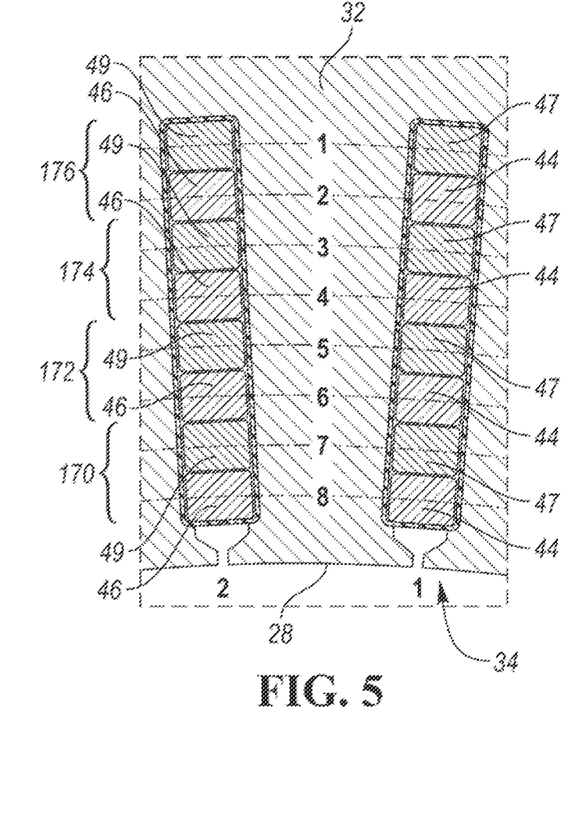
FIG. 5 is a magnified view of a portion of FIG. 4.

Referring to FIGS. 4 and 5, the slots 34 are arranged 1 through 48 in the counterclockwise direction with the odd number slots being labeled for convenience. The slots may be characterized as odd slots, i.e., slots 1, 3, 5, etc. and even slots, i.e., slots 2, 4, 6, etc. The odd and even designation is for ease of description in explaining the arrangement of the windings 40, and the structure of odd and even slots may be the same.

The slots 34 may include an inner radial layer of pins 170, an inner middle radial layer of pins 172, an outer middle radial layer of pins 174, and an outer radial layer of pins 176. Each of the layers may include at least two radial pin positions that are adjacent to each other. In the illustrated embodiment, each slot 34 has eight sequential pin positions in a one-by-eight linear arrangement, however, other arrangements are contemplated. The first position is nearest the OD 29 of the stator core 32 and the eighth position is nearest the ID 28 of the stator core 32. The inner layer 170 includes the seventh and eighth positions; the middle layer 172 includes the fifth and sixth positions; and the middle layer 174 includes the third and fourth positions, and the outer layer 176 includes the first and second positions.

Each of the slots 34 may only contain a single phase, e.g., Slot 1 only contains the U phase. The phases are arranged in groups to occupy adjacent slots in each of the poles, e.g., Slots 1 and 2 contain the U phase, Slots 3 and 4 contain the V phase, and Slots 6 and 7 contain the W phase. Each slot may include only two different paths of a same phase. For example, Slot 1 only includes path 44 and path 47 of the U phase and Slot 2 only includes path 46 and path 49. These paths alternate every other pin position along their respective slots as best shown in FIG. 5.

The stator is balanced with each path being disposed in the stator core such that, for each radial layer, the path is disposed in the odd slots and the even slots a same number of times. For example, in the inner layer 170, the first path 44 is disposed in the odd slots four times (slots 1, 7, 13, and 43) and is disposed in the even slots four times (slots 20, 26, 32, and 38).

Figure 7:
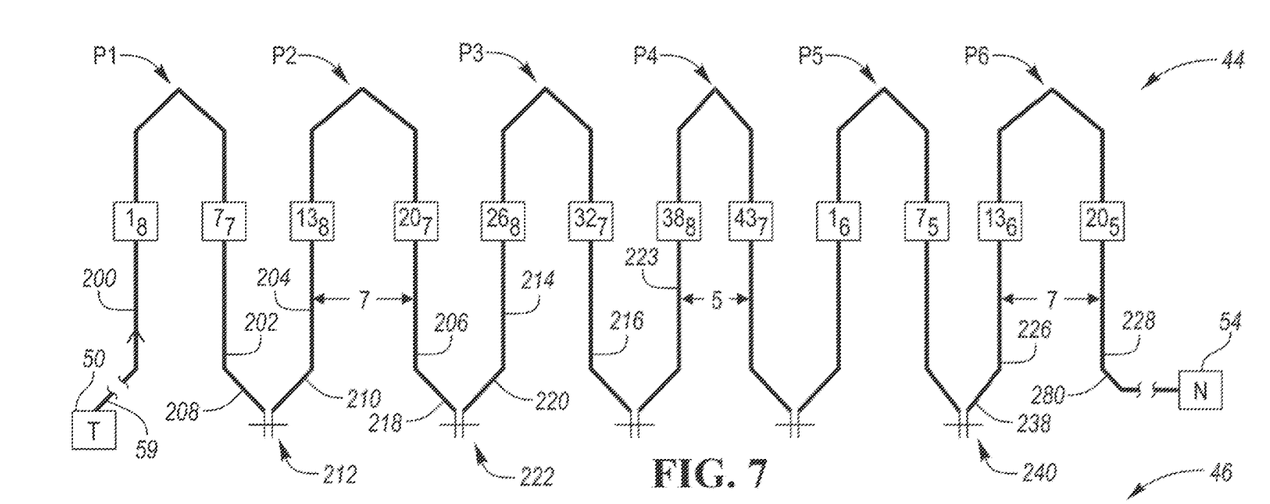
FIG. 7 is a diagrammatical view of select hairpins of a first path of the U phase.
Figure 8:
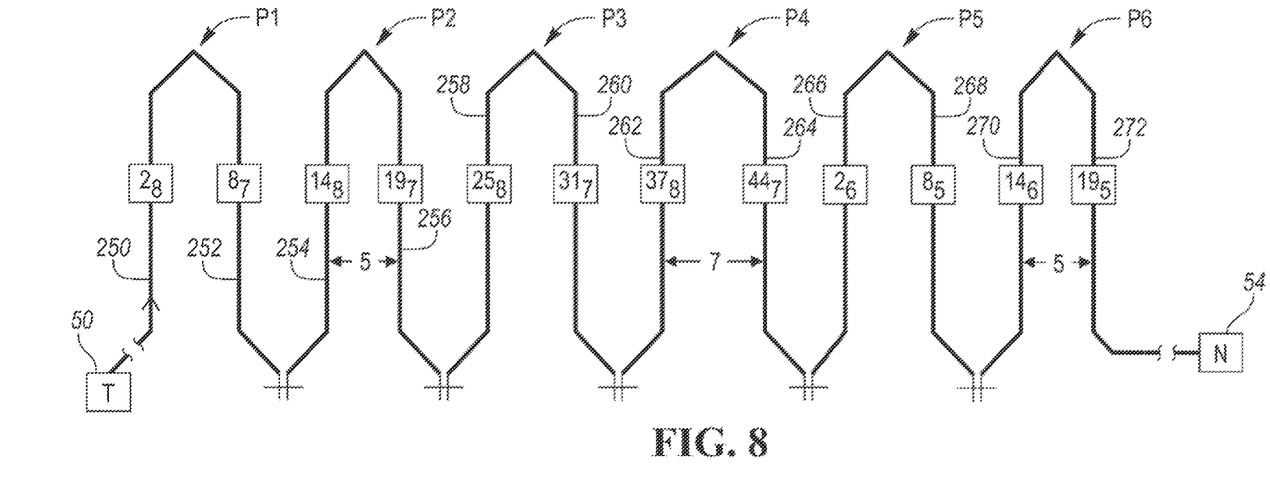
FIG. 8 is a diagrammatical view of select hairpins of a second path of the U phase.

The U phase will now be described in more detail with reference to FIGS. 6, 7, and 8. The first path 44 begins with Pin 1, a regular pin 90, having a trailing leg 200 disposed in the eighth position of Slot 1 and a leading leg 202 disposed in the seventh position of Slot 7. The first path advances in the counterclockwise direction when viewed form the weld end 38, which is to the right in FIG. 7. The terms "leading leg" and "trailing leg" refer to the position of the legs relative to the direction of advancement of the path. The trailing leg 200 is connected to the terminal 50 by the terminal lead 59.

Pin 2, a long-pitch pin 134, has a trailing leg 204 disposed in the eighth position of Slot 13 and a leading leg 206 disposed in the seventh position of Slot 20. The legs 204 and 206 have a slot span of seven. This causes the first path 44 to advance relative to the second path 46. The twist 208 of Pin 1 is attached to the twist 210 of Pin 2 by a connection 212 near Slot 10. The connection may be a weld, such as a laser weld. Pin 3, a regular pin 90, has a trailing leg 214 disposed in the eighth position of Slot 26 and a leading leg 216 disposed in the seventh position of Slot 32. The twist 218 of Pin 2 is attached to the twist 220 of Pin 3 by a connection 222 near Slot 22.

Pin 4, a short-pitch pin 122, has a trailing leg 223 disposed in the eighth position of Slot 38 and a leading leg 224 disposed in the seventh position of Slot 43. The legs 223 and 224 are spaced apart by five slots. This causes the first path 44 to retard relative to the second path 46. The first path 44 continues from Pin 4 with regular Pin 5 and long-pitch Pin 6 that are interconnected with connections, e.g., welds, as described above. Pin 6 has a trailing leg 226 disposed in the sixth position of Slot 13 and a leading leg 228 disposed in the fifth position of Slot 20. Pin 6 has a slot span of seven, which advances the first path 46 relative to the second path 46. The first path 44 continues with Pin 7 though Pin 16 and terminates at the neutral connection 54. The path 44 may be jumperless. See FIG. 6 for details. The path 44 includes 16 pins in the illustrated embodiment. Eight of the pins are regular pins, four of the pins are long-pitch pins, and four of the pins are short-pitch pins. For each radial layer, the first path may have one long-pitch pin, one short-pitch pin, and two regular pins. The short-pitch pin and the long-pitch pin may be generally disposed on opposite sides of the stator core 32.

The path 46 also includes 16 pins in the illustrated embodiment. Eight of the pins are regular pins, four of the pins are long-pitch pins, and four of the pins are short-pitch pins. For each radial layer, the second path 46 may have one long-pitch pin, one short-pitch pin, and two regular pins. The first path 44 begin in an odd-numbered slot whereas the second path begins in an even-numbered slot. These two paths will switch from the odd and even slots periodically so that the windings are balanced.

The second path 46 begins with Pin 1 having a trailing leg 250 disposed in the eighth position of slot 2 and a leading leg 252 disposed in the seventh position of slot 8. The second path 46 also advances in the counterclockwise direction when viewed form the weld end 38. The trailing leg 250 is connected to the terminal 50 by a terminal lead. The second path 46 begins ahead of the first path but switches at Pin 2.

Pin 2, a short-pitch pin 122, has a trailing leg 254 disposed in the eighth position of slot 14 and a leading leg 256 disposed in the seventh position of Slot 19. The legs are spaced apart by five slots. The short-pitch Pin 2 retards advancement of path 46 while the long-pitch Pin 2 advances the first path 44 so that the paths 44 and 46 switch position with the first path 44 now being ahead of path 46 and disposed in the even-numbered slots. The short and long-pitch pins are grouped together with one advancing and the other retarding by one slot in the illustrated embodiment. That is, the long and short-pitch pins are grouped in pairs. Pin 3, a regular pin 90, of path 46 has a trailing leg 258 disposed in the eighth position of Slot 25 and a leading leg 260 disposed in the seventh position of Slot 31.

Pin 4, a long-pitch pin 134, has a trailing leg 262 disposed in the eighth position of Slot 37 and a leading leg 264 disposed in the seventh position of Slot 44. The legs 262 and 264 are spaced apart by seven slots. The short-pitch Pin 4 retards advancement of the first path 44 while the long-pitch Pin 4 advances the second path 46 so that the paths 44 and 46 switch position with the first path 44 now being behind the second path 46 again. Pin 5, a regular pin 90, has a trailing leg 266 disposed in the sixth position of Slot 2 and a leading leg 268 disposed in the fifth position of Slot 8.

Pin 6, a short-pitch pin 122, has a trailing leg 270 disposed in the sixth position of Slot 14 and a leading leg 272 disposed in the fifth position of Slot 19. The legs 270 and 272 are spaced apart by five slots. The short-pitch Pin 6 retards advancement of the second path 146 while the long-pitch Pin 6 advances the first path 44 so that the paths 44 and 46 switch position with the first path 44 now being ahead of the second path 46. The second path 44 continues with Pin 7 though Pin 16 and terminates at the neutral connection 54. See FIG. 6 for details.

The pairs of long and short-pitch pins of paths 44 and 46, may be generally disposed in the same poles. For example, all of the long-pitch pins of path 44 are disposed in slots 13 and 20, and all of the short-pitch pins of path 46 are disposed in slots 14 and 19, i.e., mostly in pole 3. Also, all of the short-pitch pins of path 44 are disposed in slots 38 and 43, and all of the long-pitch pins of path 46 are disposed in slots 37 and 44, i.e., mostly in pole 7. The relative positions of the first and second paths switches eight times with the paths beginning and ending in the same relative position, i.e., the first path 44 finished and ends behind the second path 46.

The first and second paths 44, 46 have an equal amount of slots ahead and behind each other. That is, each path is equally in even slots and in odd slots. For each path 44 or 46, the long-pitch pins and the short-pitch pins are generally diametrical. "Generally diametrical" means within plus-or-minus one slot of being diametrical. In the illustrated stator, diametrical slots are twenty-four slots apart. In path 44, for example, the trailing legs of the long-pitch pins are in Slot 13 and the trailing legs of the short-pitch pins are in Slot 38, which is twenty-five slots a part in one direction and twenty-three slots apart in the other direction. Slots 13 and 38 are generally diametrical as twenty-five and twenty-three are within plus-or-minus one of twenty-four.

Figure 9:
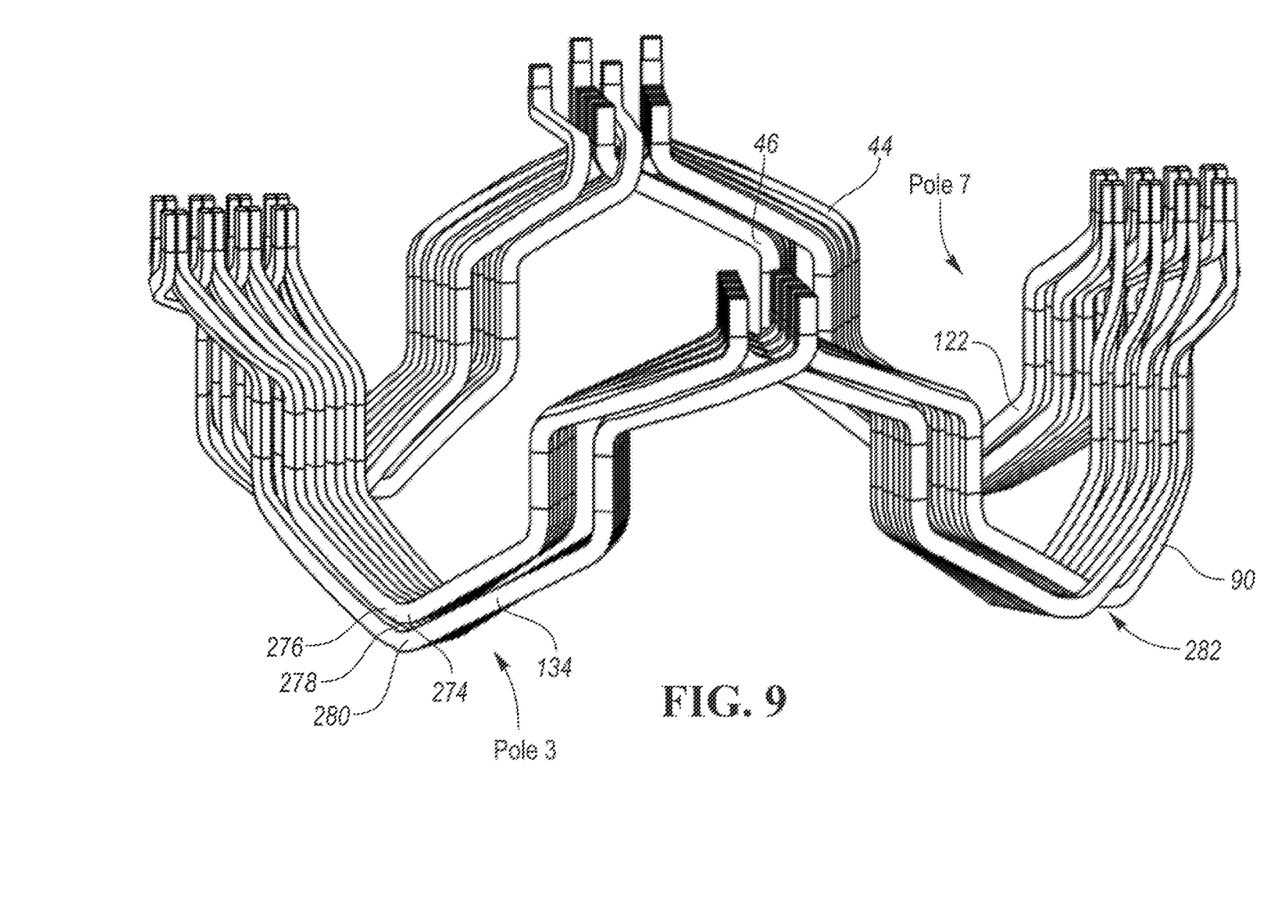
FIG. 9 is a perspective view of a portion of the first and second paths of the U phase with the stator core omitted for illustrative purposes.

Referring to FIG. 9, for each path, all the long-pitch pins 134 are disposed in same ones of the slots and all the short-pitch pins 122 are disposed in same ones of the slots. For example, in the first path 44, all of the long-pitch pins 134 may be located in slots 13 and 20, and, all of the short-pitch pins 122 may be located in slots 38 and 43. In the second path 46, all of the short-pitch pins may be located slots 14 and 19, and, all of the long-pitch pins may be located in slots 37 and 44. The short-pitch pins 122 may nest within the long-pitch pins 134 with the tops 274 of the crowns 276 of the short-pitch pins being adjacent to the bottoms 278 of the crowns 280 of the long-pitch pins 134. To accomplish this, the crowns 280 of the long-pitch pins extend farther form the end of the stator than the crowns of the short-pitch pins. The regular pins 90 may not nest with each other and instead may crisscross as shown by arrow 282 in FIG. 9.

Figure 6:
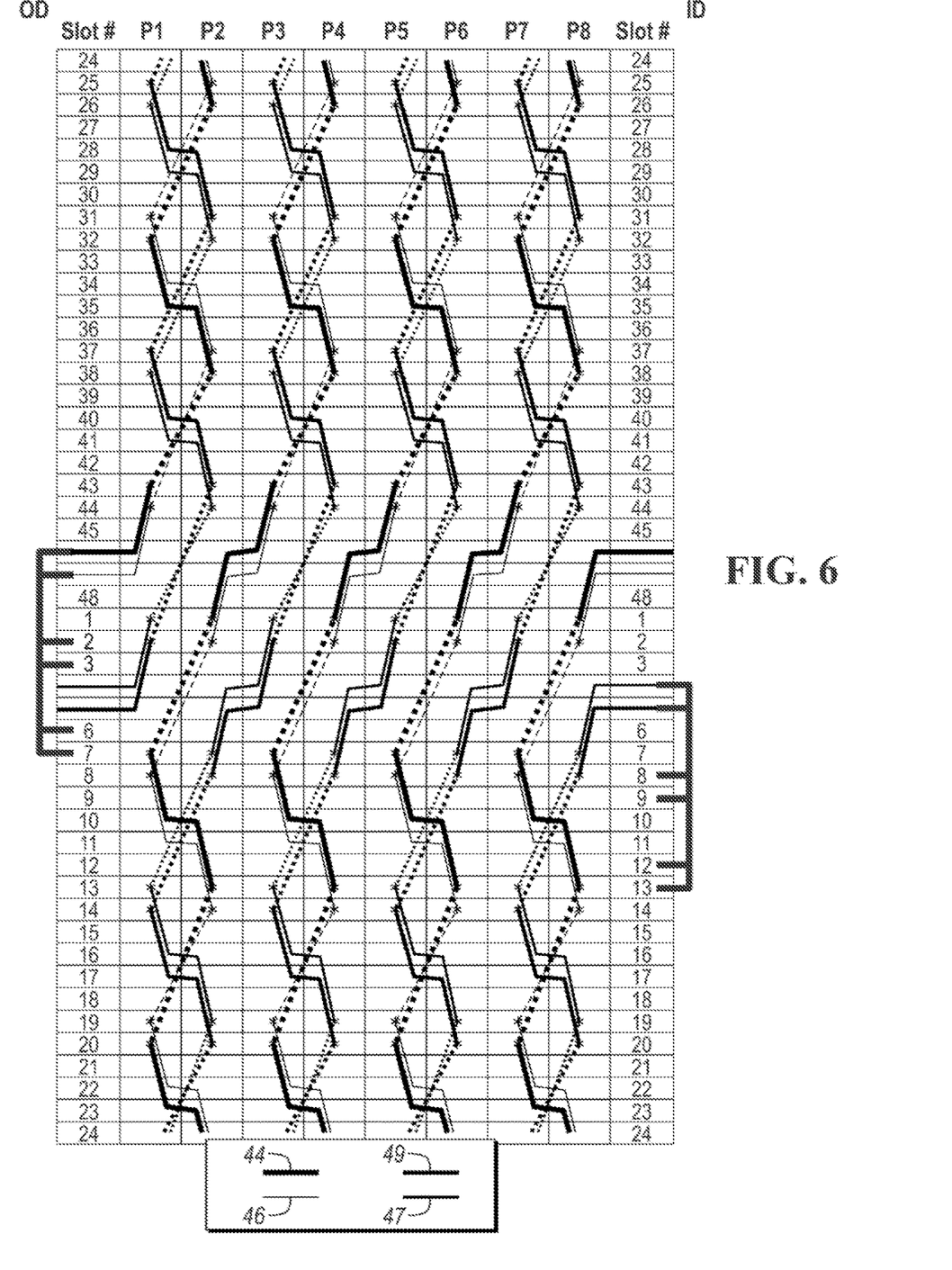
FIG. 6 is a winding diagram of a U phase of the windings looking from a weld side of the stator.

Referring to back to FIGS. 2 and 6, the third and fourth paths 47 and 49 of the U phase begin at the OD 29 of the stator at terminal 50 and wind in the clockwise direction. The third and fourth paths 47, 49 may be jumperless. The third path 47 begins at Pin 1 having a trailing leg disposed in the first position of Slot 1 and a leading leg disposed in the second position of Slot 44. Pin 1 is a short-pitch pin. In order to connect to the terminal 50, the trailing leg of Pin 1 includes a counter twist 300 that extends inwardly in the counterclockwise direction connect to the terminal 50. The leading leg of Pin 1 includes a regular twist that extends outwardly in the clockwise direction away from Pin 1. Pin 1 of the fourth path 49 also includes a counter twist 304 to connect with the terminal 50. Pin 1 of path 49 is a long-pitch pin. These long and short-pitch pins nest with one another similar to the long and short-pitch pins of paths 44 and 46.

Similar to the first and second paths 44 and 46, the third and fourth paths 47 and 49 are located in adjacent slots. The path 47 begins at Slot 1 and continues around the stator core 32 in the clockwise direction, and path 49 beings in Slot 2 and continues around the stator core 32 in the clockwise direction as shown in the winding diagram of FIG. 6. Like paths 44 and 46, each path 47 and 49 includes 16 pins in the illustrated embodiment. Eight of the pins are regular pins, four of the pins are long-pitch pins, and four of the pins are short-pitch pins. For each radial layer, the paths 47 and 49 may have one long-pitch pin, one short-pitch pin, and two regular pins. In path 47, for example, the long-pitch pins may be disposed in slots 19 and 26, and the short-pitch pins may be disposed in slots 44 and 1. In path 49, for example, the long-pitch pins may be in slots 43 and 2, and the short-pitch pins may be in slots 20 and 25. The third path 47 begins in an odd-numbered slot whereas the fourth path 49 began in even-numbered slot. These two paths will switch from the odd and even slots periodically so that the windings are balanced.

The U phase may be arranged so that, in each radial layer, the long and short-pitch pairs of paths 44 and 46 are adjacent to the long and short-pitch pairs of paths 47 and 49. For example, all of the long and short-pitch pins are located generally in either, Pole 3, Pole 4, Pole 7, or Pole 8.

The V and W phases of the windings 40 may be the same or similar to the U phase but shifted to different slots. For brevity, Applicant will not repeat all of the above information in explaining the V and W phase; please refer to the above description for further details.

Figure 10:
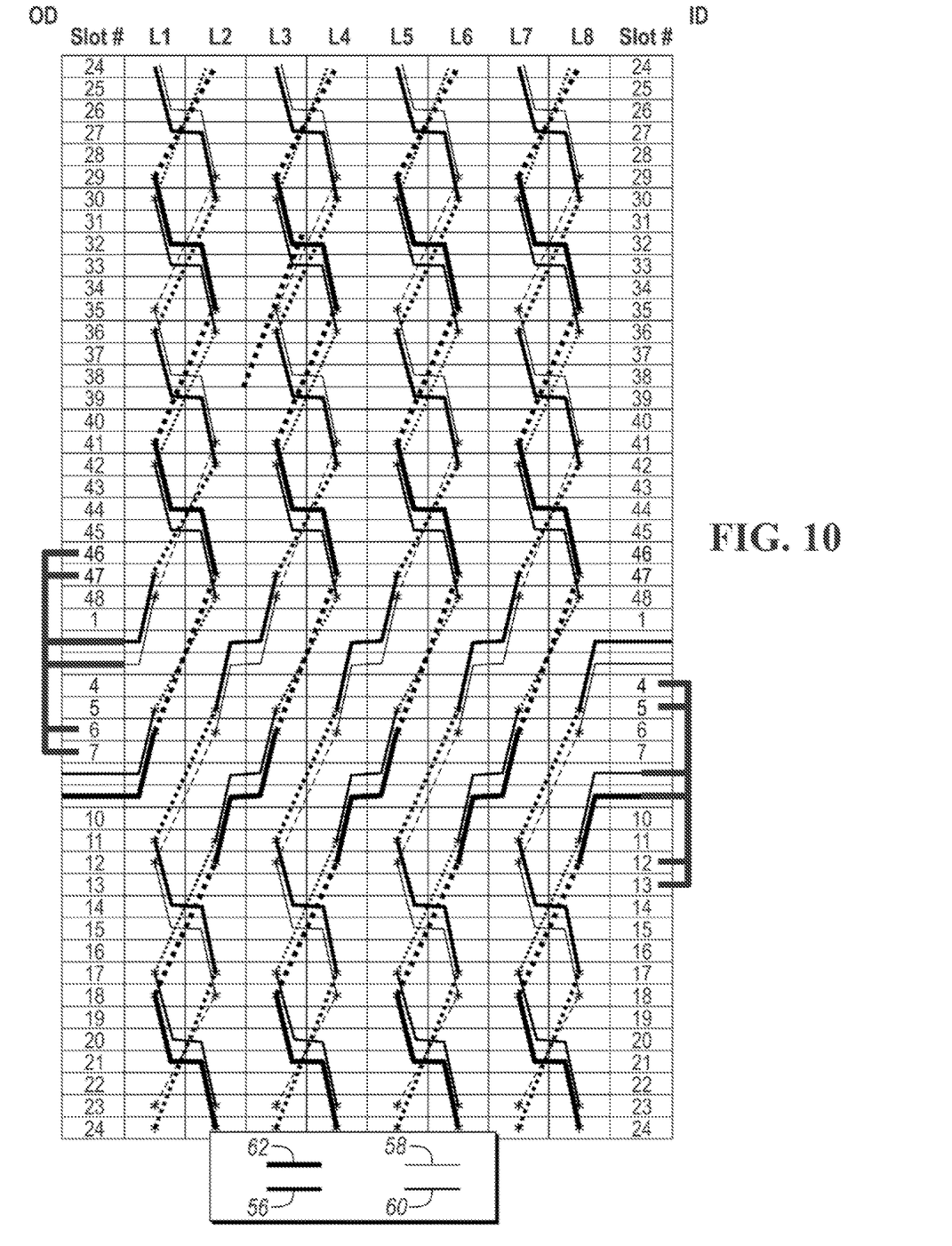
FIG. 10 is a winding diagram of a V phase of the windings looking from a weld side of the stator.

Referring to FIG. 10, the V phase may be shifted over four slots in the counterclockwise direction to have Pin 1 of path 56 disposed in slots 5 and 11 and to have Pin 1 of path 58 disposed in slots 6 and 12. The paths 56 and 58 extend in the counterclockwise direction, which is down in FIG. 10. The path 56 may begin in an odd numbered slot and the path 58 may begin in an even numbered slot. The paths 56 and 58 weave around the stator core alternating between even and odd numbered slots so that for each radial layer each of the paths is in equal number of even and odd slots similar to the U phase. See above for more details.

In the inner radial layer, Pin 2 of path 56 may be a long-pitch pin having a trailing leg in Slot 17 and a leading leg and Slot 24. Pin 2 of path 58 may be a short-pitch pin having a trailing leg disposed in Slot 18 and a leading leg disposed in Slot 23. Also in the inner radial layer, Pin 4 of the path 56 may be a short-pitch pin having a trailing leg and Slot 42 and a leading leg in Slot 47. Pin 4 of the path 58 may be a long-pitch pin having a trailing leg and Slot 41 and a leading leg and Slot 48. Similar to the U phase, all of the long-pitch pins of the path 56 may be disposed in slots 17 and 24 and all of the short-pitch pins of the path 56 may be disposed in slots 42 and 47. All of the short-pitch pins of the path 58 may be disposed in slots 18 and 23 and all of the long-pitch pins of the path 58 may be disposed in slots 41 and 48. See FIG. 10 for further detail regarding the winding of paths 56 and 58.

Pin 1 of path 60 is disposed in slots 5 and 48 and Pin 1 of path 62 is disposed in slots 6 and 47. The paths 60 and 62 extend in the clockwise direction, which is up in FIG. 10. The path 60 may begin in an odd numbered slot and the path 62 may begin in an even numbered slot. The paths 60 and 62 weave around the stator core alternating between even and odd numbered slots so that for each radial layer, each of the paths is in an equal number of even and odd slots similar to the U phase. See above for more details.

In the outer radial layer, Pin 1 of path 60 may be a short-pitch and Pin 2 of path 62 may be a long-pitch pin Also in the outer radial layer, Pin 3 of the path 60 may be a long-pitch pin having a trailing leg and Slot 30 and a leading leg in Slot 23. Pin 3 of the path 62 may be a short-pitch pin having a trailing leg in Slot 29 and a leading leg in Slot 24. Similar to the U phase, all of the short-pitch pins of the path 60 may be disposed in slots 5 and 48 and all of the long-pitch pins of the path 60 may be disposed in slots 30 and 23. All of the long-pitch pins of the path 62 may be disposed in slots 6 and 47, and all of the short-pitch pins of the path 62 may be disposed in slots 29 and 24. See FIG. 10 for further detail regarding the winding of paths 60 and 62.

Figure 11:
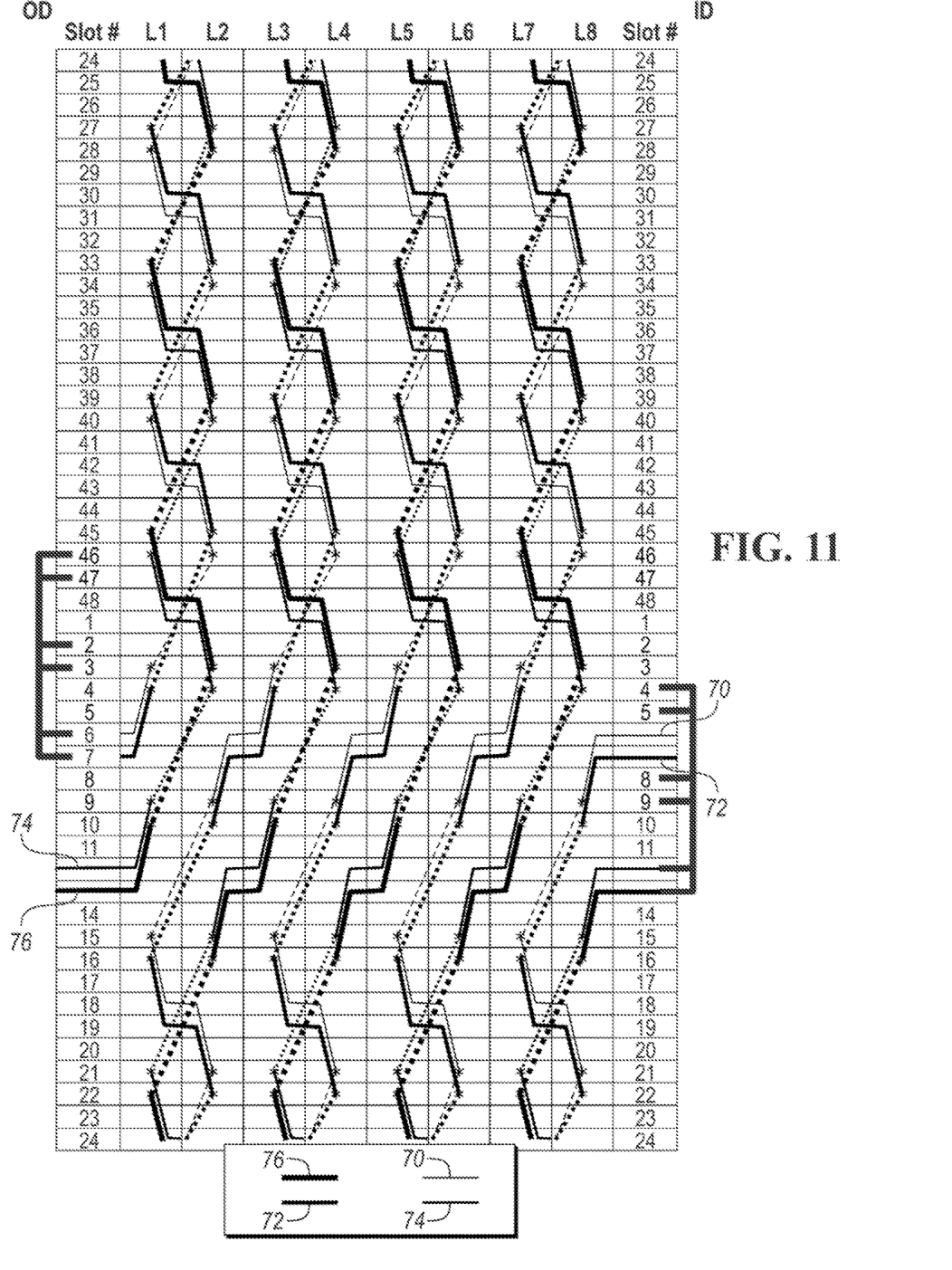
FIG. 11 is a winding diagram of a W phase of the windings looking from a weld side of the stator.

Referring to FIG. 11, the W phase may be shifted over eight slots in the counterclockwise direction to have Pin 1 of path 70 disposed in slots 9 and 15 and to have Pin 1 of path 72 disposed in slots 10 and 16. The paths 70 and 72 extend in the counterclockwise direction, which is down in FIG. 11. The path 70 may begin in an odd numbered slot and the path 72 may begin in an even numbered slot. The paths 70 and 72 weave around the stator core alternating between even and odd numbered slots so that, for each radial layer, each of the paths is in an equal number of even and odd slots similar to the U phase. See above for more details.

In the inner radial layer 170, Pin 2 of path 70 may be a long-pitch pin having a trailing leg in Slot 21 and a leading leg and Slot 28. Pin 2 of path 72 may be a short-pitch pin having a trailing leg disposed in Slot 22 and a leading leg disposed in Slot 27. Also in the inner radial layer, Pin 4 of the path 70 may be a short-pitch pin having a trailing leg in Slot 46 and a leading leg in Slot 3. Pin 4 of the path 70 may be a long-pitch pin having a trailing leg in Slot 45 and a leading leg and slot 4. Similar to the U phase, all of the long-pitch pins of the path 70 may be disposed in slots 21 and 28 and all of the short-pitch pins of the path 70 may be disposed in slots 46 and 3. All of the short-pitch pins of the path 72 may be disposed in slots 18 and 23 and all of the long-pitch pins of the path 72 may be disposed in slots 22 and 27. See FIG. 11 for further detail regarding the winding of paths 70 and 72.

Pin 1 of path 74 is disposed in slots 9 and 4 and Pin 1 of path 76 disposed in slots 10 and 3. The paths 74 and 76 extend in the clockwise direction, which is up in FIG. 11. The path 74 may begin in an odd numbered slot and the path 72 may begin in an even numbered slot. The paths 74 and 76 weave around the stator core alternating between even and odd numbered slots so that, for each radial layer, each of the paths is in equal number of even and odd slots similar to the U phase. See above for more details.

In the outer radial layer 176, Pin 1 of path 74 may be a short-pitch and Pin 2 of path 76 may be a long-pitch pin. Also in the outer radial layer, Pin 3 of the path 74 may be a long-pitch pin having a trailing leg in Slot 34 and a leading leg in Slot 27. Pin 3 of the path 76 may be a short-pitch pin having a trailing leg in Slot 33 and a leading leg in Slot 28. Similar to the U phase, all of the short-pitch pins of the path 74 may be disposed in slots 9 and 4 and all of the long-pitch pins of the path 74 may be disposed in slots 34 and 27. All of the long-pitch pins of the path 76 may be disposed in slots 10 and 3, and all of the short-pitch pins of the path 76 may be disposed in slots 33 and 28. See FIG. 11 for further detail regarding the winding of paths 74 and 76.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
   a stator core defining circumferentially arranged slots alternating between odd and even slots, each slot having radial pin positions arranged in adjacent pairs to define radial layers; and
   a hairpin winding including a first path of interconnected hairpins that is disposed in the stator core such that, for each of the radial layers, the first path is disposed in the odd slots and the even slots a same number of times, wherein the first path includes regular pins, short-pitch pins, and long-pitch pins, and wherein all of the short-pitch pins are disposed in first same ones of the slots, and all of the long-pitch pins are disposed in second same ones of the slots; and wherein the hairpin winding further includes a second path of second interconnected hairpins that are of a same phase as the first path, the second path being disposed in the stator core such that, for each of the radial layers, the second path is disposed in the odd slots and the even slots a same number of times, and wherein the second path includes regular pins, short-pitch pins, and long-pitch pins, and wherein all of the short-pitch pins are disposed in third same ones of the slots, and all of the long-pitch pins are disposed in fourth same ones of the slots.

2. The electric machine of claim 1, wherein the hairpin winding further includes a second path of second interconnected hairpins that is disposed in the stator core such that, for each of the radial layers, the second path is disposed in the odd slots and the even slots a same number of times.

3. The electric machine of claim 2, wherein the hairpin winding further includes a third path of third interconnected hairpins that is disposed in the stator core such that, for each of the radial layers, the third path is disposed in the odd slots and the even slots a same number of times.

4. The electric machine of claim 3, wherein the hairpin winding further includes a fourth path of fourth interconnected hairpins that is disposed in the stator core such that, for each of the radial layers, the fourth path is disposed in the odd slots and the even slots a same number of times.

5. The electric machine of claim 4, wherein the first, second, third, and fourth paths are of a same phase of the electric machine.

6. The electric machine of claim 5 further comprising a first neutral bridge and a second neutral bridge, wherein the first and second paths are connected to the first neutral bridge, and the third and fourth paths are connected to the second neutral bridge.

7. The electric machine of claim 1, wherein the first path includes regular pins, short-pitch pins, and long-pitch pins, wherein an amount of regular pins is equal to a sum of the long-pitch pins and the short-pitch pins, and there is an equal amount of short-pitch pins and long-pitch pins.

8. The electric machine of claim 1, wherein the regular pins have a span of N slots, the short-pitch pins have a span of N−1 slots, and the long-pitch pins have a span of N+1 slots.

9. The electric machine of claim 1, wherein the stator core includes forty-eight slots, eight poles, eight pin positions, and four radial layers, and wherein N equals six.

10. The electric machine of claim 1, wherein the second same ones of the slots are generally diametrical to the first same one of the slots.

11. An electric machine comprising:
    a stator core defining circumferentially arranged slots, each slot having radial pin positions arranged in adjacent pairs to define radial layers; and
    a first phase of a hairpin winding including:
      a plurality of first hairpins interconnected to each other without a jumper to form a first winding path, the first hairpins including first short-pitch pins and first long-pitch pins, wherein the first path is disposed in corresponding ones of the slots such that one of the first short-pitch pins and one of the first long-pitch pins are disposed in each of the radial layers, wherein the first path includes regular pins, short-pitch pins, and long-pitch pins, and wherein all of the short-pitch pins are disposed in first same ones of the slots, and all of the long-pitch pins are disposed in second same ones of the slots, and
      a plurality of second hairpins interconnected to each other without a jumper to form a second winding path, the second hairpins including second short-pitch pins and second long-pitch pins, wherein the second path is disposed in corresponding ones of the slots such that one of the second short-pitch pins and one of the second long-pitch pins are disposed in each of the radial layers, wherein the second path includes regular pins, short-pitch pins, and long-pitch pins, and wherein all of the short-pitch pins are disposed in third same ones of the slots, and all of the long-pitch pins are disposed in fourth same ones of the slots.

12. The electric machine of claim 11, wherein the slots are alternatively arranged between odd and even ones of the slots, and wherein the first path is disposed in the odd ones of the slots and the even ones of the slots a same number of times, and the second path is disposed in the odd ones of the slots and the even ones of the slots a same number of times.

13. The electric machine of claim 11, wherein all of the first long-pitch pins are disposed in first same ones of the slots, and all of the first short-pitch pins are disposed in second same ones of the slots.

14. The electric machine of claim 13, wherein all of the second long-pitch pins are disposed in third same ones of the slots, and all of the second short-pitch pins are disposed in fourth same ones of the slots.

15. The electric machine of claim 13, wherein the first same ones of the slots are located within a first span of slots, and the fourth same ones of the slots are located within the first span of slots, and wherein the third same ones of the slots are located within a second span of slots, and the second same ones of the slots are located within the second span of slots.

16. The electric machine of claim 11, wherein the first phase further includes:
    a plurality of third hairpins interconnected to each other without a jumper to form a third winding path, the third hairpins including third short-pitch pins and third long-pitch pins, wherein the third path is disposed in corresponding ones of the slots such that one of the third short-pitch pins and one of the third long-pitch pins are disposed in each of the radial layers, and
    a plurality of fourth hairpins interconnected to each other without a jumper to form a fourth winding path, the fourth hairpins including fourth short-pitch pins and fourth long-pitch pins, wherein the fourth path is disposed in corresponding ones of the slots such that one of the fourth short-pitch pins and one of the fourth long-pitch pins is disposed in each of the radial layers.

17. The electric machine of claim 16, wherein leading legs of the first long-pitch pins are disposed in a same one of the slots as trailing legs of the fourth short-pitch pins, and wherein the leading legs of the second short-pitch pins are disposed in a same one of the slots as trailing legs of the third long-pitch pins.

* * * * *